Oct. 5, 1926. 1,602,328
C. A. BLUHM
SHOCK ABSORBER FOR VEHICLES
Filed July 10, 1925 2 Sheets-Sheet 1
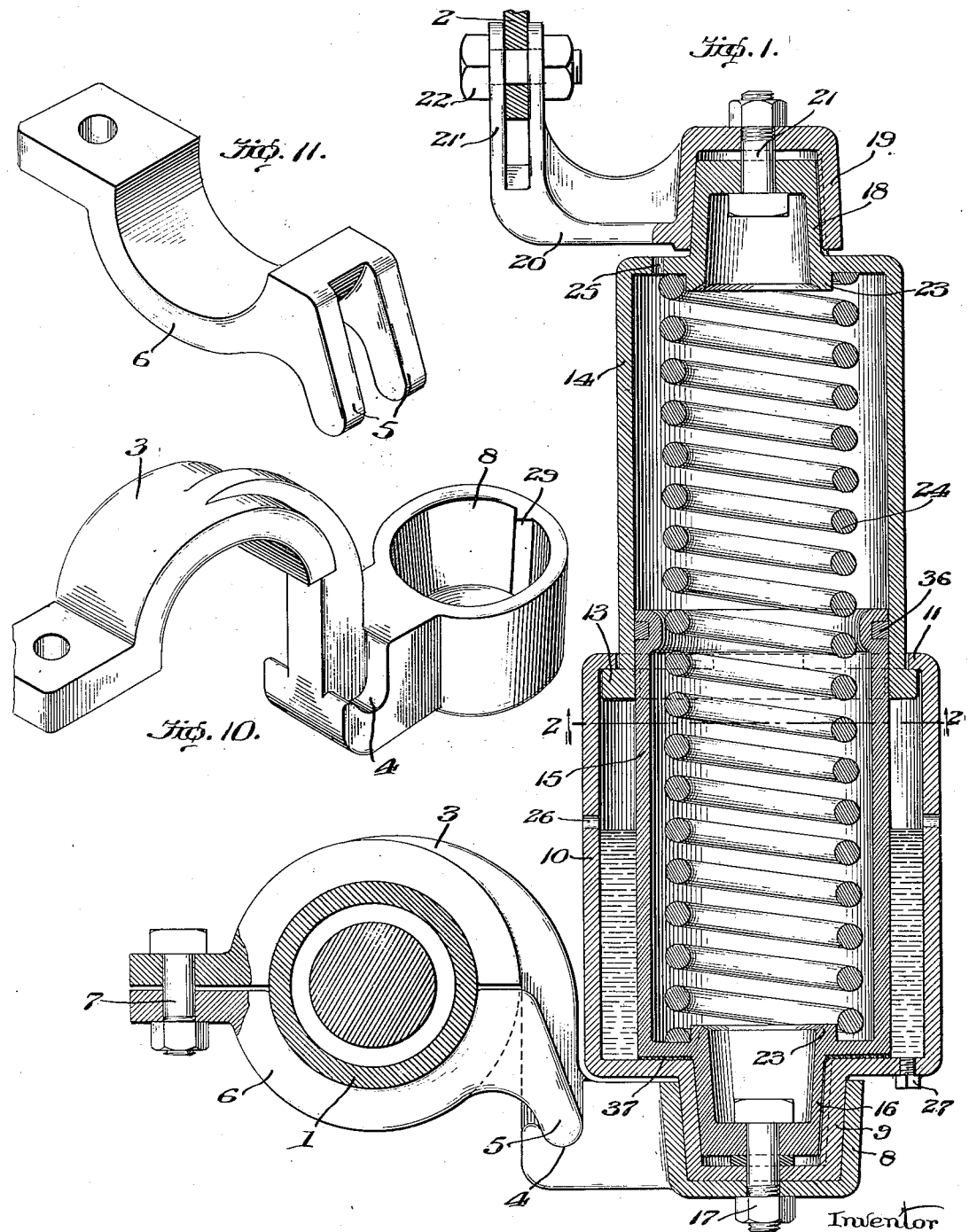

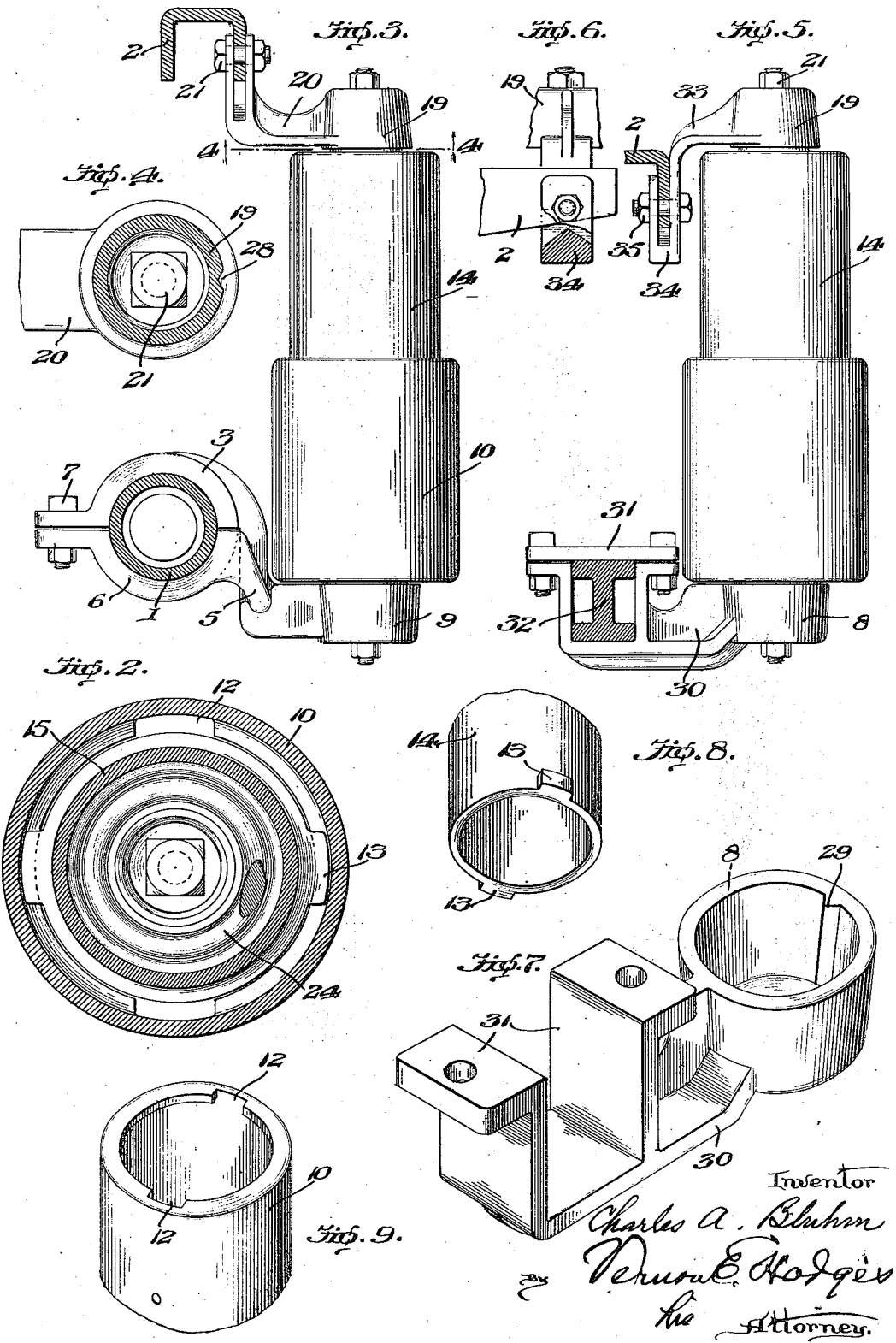

Patented Oct. 5, 1926.

1,602,328

UNITED STATES PATENT OFFICE.

CHARLES A. BLUHM, OF MICHIGAN CITY, INDIANA.

SHOCK ABSORBER FOR VEHICLES.

Application filed July 10, 1925. Serial No. 42,693.

This invention relates to an improvement in shock absorbers for vehicles.

The object of the invention is to provide an improved shock absorber, which, when placed between the vehicle axle and the chassis, will automatically absorb the shock, imparted to the vehicle by uneven places and holes in the road. The initial compression is taken up by coil springs, housed within the cylinders, and as a further cushioning means, air is admitted into the cylinder so as to check the rebound.

This invention is more particularly directed to an improved dust hood, which is placed about the lower-most cylinder and is so connected with the upper and lower cylinders as to removably connect the same together. A space is provided between the cylinders and the cylinder dust-guard for receiving and containing lubricating oil to lubricate the cylinders as they are compressed.

Improved means is also provided in this invention for securely fastening the shock absorber to the vehicle by providing cup-shaped extensions on the ends of the cylinders over which extensions brackets are fitted and secured, the brackets in turn being connected directly to the frame or axle of the vehicle. The cup-shaped extensions are provided with a notch in the edges thereof into which lugs carried by the brackets are adapted to fit, so as to provide a means for holding the cylinders in a fixed position, relative to the brackets.

In the accompanying drawings:—

Fig. 1 is a vertical section of my improved shock absorber as applied to the vehicle;

Fig. 2 is a transverse section on the lines 2—2 of Fig. 1;

Fig. 3 is a side elevation of the shock absorber as shown in Fig. 1;

Fig. 4 is a transverse section on the lines 4—4 of Fig. 3;

Fig. 5 is a side elevation of my improved shock absorber as applied to the front axle of the vehicle;

Fig. 6 is a detail side elevation partly in section of the securing bracket for said front shock absorber;

Fig. 7 is a perspective view of the lower securing bracket for fastening the lower end of the shock absorber to the front axle;

Fig. 8 is a perspective view of the top cylinder detached;

Fig. 9 is a perspective view of the dust-guard detached;

Fig. 10 is a perspective view of the hanger supporting bracket for attaching the shock absorber to the rear axle housing of the vehicle; and Fig. 11 is a perspective view of the clamping bracket for cooperating with the hanger bracket, shown in Fig. 10.

As shown in Figs. 1 and 2, the numeral 1 indicates the rear axle housing of the vehicle, and the numeral 2, the vehicle frame or chassis. Secured to the housing 1 is a hanger supporting bracket 3 provided with side notches 4, for receiving the forked ends 5 of the clamping bracket 6. The hanger bracket 3 and clamping bracket 6 surround the rear axle housing 1 and are clamped tightly thereon by means of the bolts 7. The hanger supporting bracket 3 terminates in a cup-shaped extension 9 on the cylindrical dust-guard 10. The dust-guard 10 is provided with an inwardly extending flange 11, provided with slots 12 therein, as shown in Fig. 9, for receiving the lugs 13 on the lower end of the upper cylinder 14. The lower cylinder 15 is telescopically fitted into the cylinders 10 and 14 and said cylinder 15 is provided with a cup-shaped extension 16 on its lower end for fitting into the extension 9, and these three extensions 8, 9, and 16, are secured together by means of a bolt 17. A corresponding cup-shaped extension 18 is formed on the upper end of the upper cylinder 14 and the cup-shaped end 19 of the upper bracket 20 fits over this extension 18, and is secured thereto by means of a bolt 21. The bracket 20 is provided with a forked end 21', which fits over and is secured to the chassis frame 2 by means of the bolt 22. Seats 23 are formed on the inner ends of the cylinders 14 and 15 for receiving the ends of the spiral cushioning spring 24, which is housed within these cylinders to act as a shock absorbing means, and as a further means for this purpose, a small orifice 25 is formed in the upper end of the cylinder 14 so as to slowly admit air into the cylinders but to limit the outlet of air so as to confine it to a certain extent within the cylinders in order that it may also act as a cushioning means.

The space between the cylinders 10 and 15 is adapted to receive lubricating oil through the opening 12, and holes 26 are provided in the cylindrical guard 10 to act as an over-flow for the oil, and a drain-plug 27 is provided in the lower end of the cylinder 10 for draining the oil from this space.

A notch 28 is formed on each of the cup-shaped extensions 16 and 18 for receiving a lug 29 formed on each of the cup-shaped members 9 and 19, so as to prevent the cylinders from turning, relative to the brackets.

The variation, shown in Figs. 5, 6, and 7, is merely in the form of brackets for securing the shock absorber to the vehicle, the bracket 30 has the clamping jaws 31 at the outer end thereof for clamping the lower end of the shock absorber 32 to the front axle. The upper bracket 33 is provided with a hooked lower end 34 for engaging the chassis frame 2 and is secured to this frame by means of the bolt 35, so as to secure the upper end of this front shock absorber to the front end of the chassis frame.

In assembling the device, the upper and lower cylinders 14 and 15 are secured to the respective supporting brackets by means of the bolts 17 and 19, after which a spring 24 is placed between the cylinders and compressed thereby as the cylinders are brought together with the lugs 13, registering with the openings 12 so as to allow the upper cylinder to slide into the cylindrical guard 10, when this upper cylinder is given a one-quarter turn, so as to bring each of the lugs 13 mid-way between the openings 12 forming an abutment to prevent the cylinders from being forced apart.

The device is now ready to be assembled on the vehicle either at the front or rear thereof, and if at the rear, the supporting brackets 3 and 20 shown in Figs. 1 and 3 must be used, but if it is used on the front of the vehicle, the supporting brackets 30 and 33 shown in Figs. 5 and 7 must be used.

It will thus be seen that I have provided an improved shock absorber which may be easily and quickly installed on the vehicle and will provide for checking up any shock caused by uneven surfaces in the road, and the air used in connection with the spiral spring acts to take up the rebound of the shock.

The numeral 36 indicates a packing ring in the upper end of the cylinder 15. The numeral 37 indicates a gasket interposed between the lower ends of the cylinder 15 and dust-guard 10, in order to prevent the oil from working through the sides of these cylinders and through the openings surrounding the bolts 17.

I claim:—

1. A shock absorber including telescopic cylinders, shock absorbing means therein, and a dust guard connected with and spaced apart from one of said cylinders, providing a space therebetween for receiving and containing a lubricant.

2. A shock absorber including upper and lower telescopic cylinders, shock absorbing means therein, and a dust guard connected with and spaced apart from the lower cylinder, providing a space therebetween for receiving and containing a lubricant in which the upper cylinder is adapted to work.

3. A shock absorber including telescopic cylinders, shock absorbing means therein, one of said cylinders having laterally projecting lugs thereon, and a cylindrical dust guard having openings therein for receiving the lugs for removably connecting said cylinders together.

4. A shock absorber including upper and lower telescopic cylinders, a spiral spring interposed therebetween, the upper cylinder having an air vent therein and having laterally projecting lugs thereon, a cylindrical dust guard having openings therein for receiving the lugs for removably connecting said cylinders together, said dust guard being spaced apart from the cylinders, providing a space therebetween for receiving a lubricant, and means for securing the shock absorber to a vehicle.

5. A shock absorber including upper and lower telescopic cylinders, a spiral spring housed therein, said upper cylinder having an air vent therein, and having lateral projections on the sides thereof, a cylindrical dust guard having openings therein for receiving the lateral projections and removably connecting the cylinders together, said cylinders having cup-shaped projections on the ends thereof, and brackets fitted over and secured to said cup-shaped projections for connecting the cylinders to a vehicle.

6. A shock absorber including upper and lower telescopic cylinders, a spiral spring housed therein, said upper cylinder having an air vent therein, and having lateral projections on the sides thereof, a cylindrical dust guard having openings therein for removably receiving the lateral projections, said cylinders having cup-shaped projections on the ends thereof, brackets fitted over the cup-shaped projections and connected with a vehicle, and means for securing the brackets to the cup-shaped projections in a fixed position relative to each other.

7. The combination with a shock absorber having a substantially cylindrical extension formed thereon, of a bracket fitted over said extension for securing the shock absorber to a vehicle, and means for preventing a turning movement of the bracket relative to said extension.

8. The combination with a shock absorber having a substantially cylindrical extension formed thereon, of a bracket fitted over said extension for securing the shock absorber to a vehicle, said extension having a notch formed therein, and a lug formed on the bracket for engaging the notch and preventing a turning movement of the bracket relative to said extension.

9. The combination with a shock absorber, of means for securing said shock absorber to the frame of a vehicle, including a hanger bracket secured to and extending outwardly from said shock absorber, said hanger bracket being fitted over the frame and having notches formed therein, and a clamping bracket having a forked end received in the notches and secured in position under the frame to the hanger bracket.

10. The combination with a shock absorber, of means for securing said shock absorber to the frame of a vehicle, including a hanger bracket secured to and extending outwardly from said shock absorber, said hanger bracket being connected with the frame and having a notch formed therein, and a clamping bracket having an end received in the notch and secured in position to the hanger bracket.

In testimony whereof I affix my signature.

CHARLES A. BLUHM.